Oct. 24, 1967  E. N. BOYLES  3,348,636
GUIDE MEANS FOR DISC BRAKE FRICTION PADS
Filed Nov. 9, 1965  4 Sheets-Sheet 1
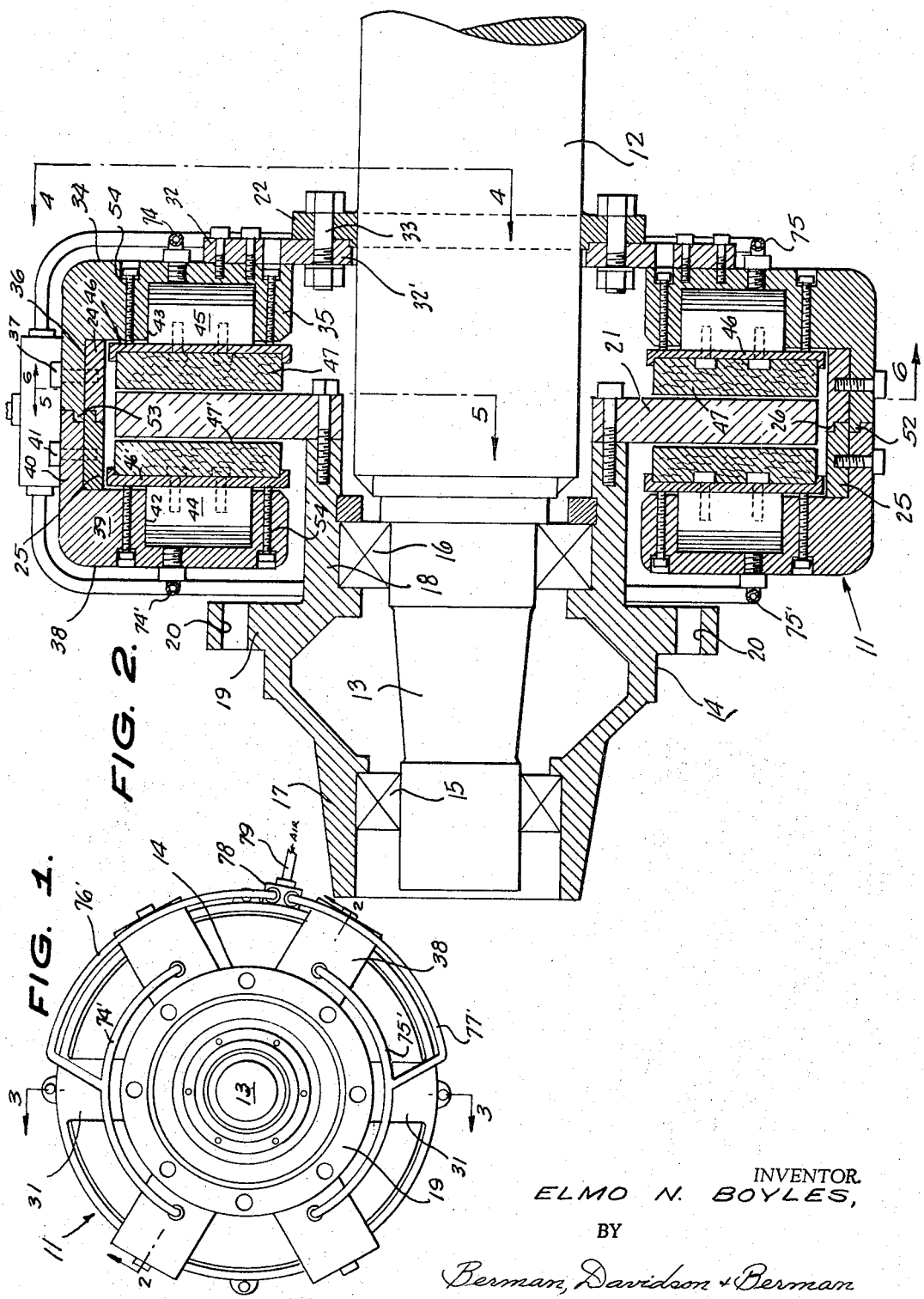
INVENTOR.
ELMO N. BOYLES,
BY
Berman, Davidson & Berman
ATTORNEYS.

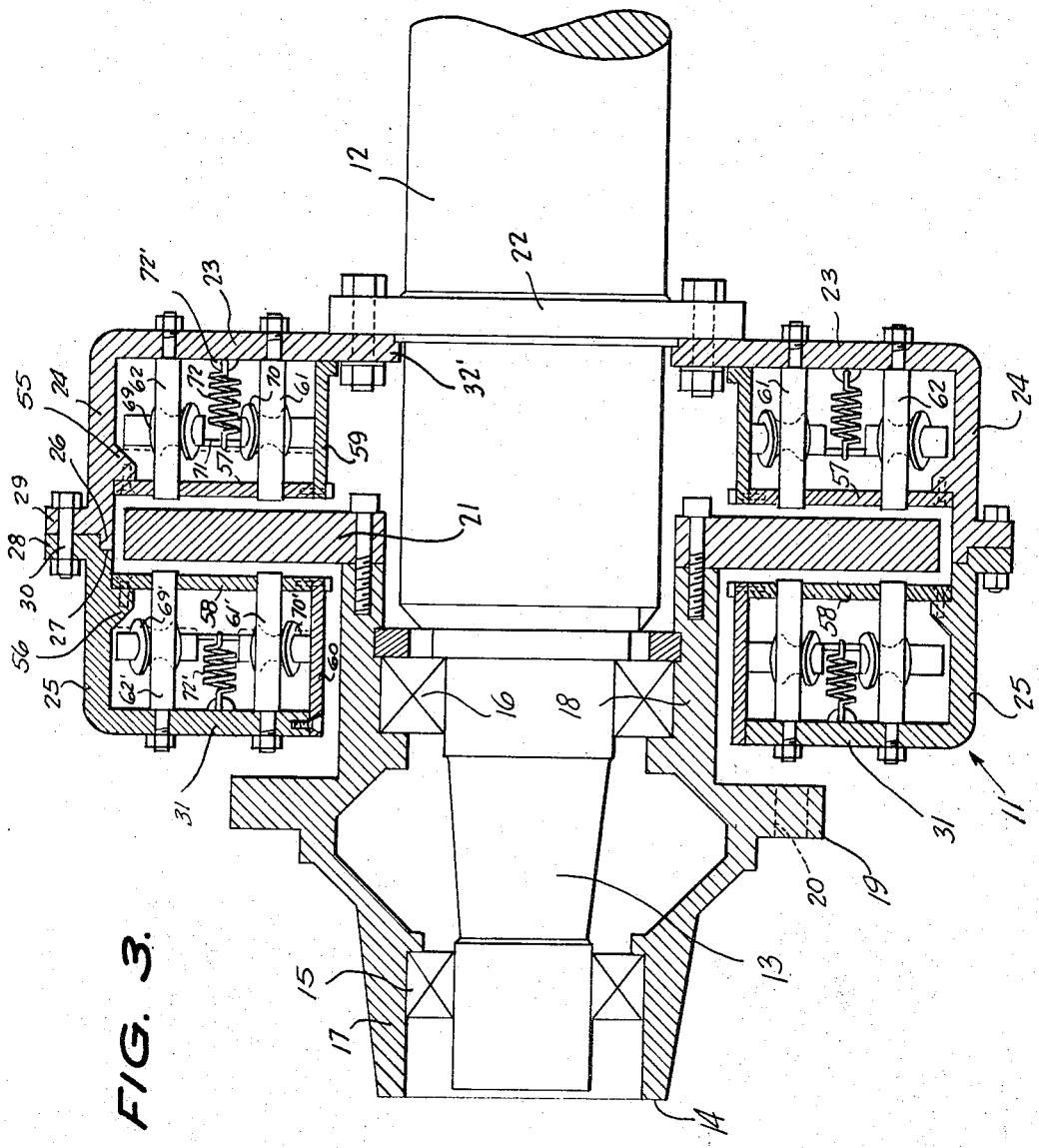

Oct. 24, 1967  E. N. BOYLES  3,348,636
GUIDE MEANS FOR DISC BRAKE FRICTION PADS
Filed Nov. 9, 1965  4 Sheets-Sheet 3

INVENTOR.
ELMO N. BOYLES,
BY
Berman, Davidson & Berman
ATTORNEYS.

Oct. 24, 1967   E. N. BOYLES   3,348,636
GUIDE MEANS FOR DISC BRAKE FRICTION PADS
Filed Nov. 9, 1965   4 Sheets-Sheet 4

INVENTOR.
ELMO N. BOYLES,
BY
Berman, Davidson & Berman
ATTORNEYS.

United States Patent Office 3,348,636
Patented Oct. 24, 1967

3,348,636
GUIDE MEANS FOR DISC BRAKE
FRICTION PADS
Elmo N. Boyles, P.O. Box 951, Orlando, Fla. 32802
Filed Nov. 9, 1965, Ser. No. 506,989
6 Claims. (Cl. 188—73)

ABSTRACT OF THE DISCLOSURE

A vehicle brake assembly consisting of a friction brake disc secured on a vehicle wheel, an annular housing secured on the vehicle frame and surrounding the brake disc, pairs of opposing brake shoes in the housing located on opposite sides of the disc, and radially-extending exposed hydraulic cylinder blocks carried by the housing on opposite sides of the brake disc, the blocks containing pistons drivingly-connected to the brake shoes. The brake shoes are provided at their ends with peripherally-grooved guide rollers engaged with transversely-extending guide rods secured in the housing to guide and support the shoes as they move toward and away from the brake disc.

---

This invention relates to vehicle brakes, and more particularly to an improved vehicle brake assembly of the disc type.

A main object of the invention is to provide an improved disc brake assembly which is relatively simple in construction, which has high heat dissipating capacity, and which provides effective braking action even under extreme loading conditions.

A further object of the invention is to provide an improved disc brake assembly of the fluid-operated type, the assembly involving relatively inexpensive components, employing parts which are very rugged in construction and resistant to wear, being relatively compact in size, being self-cooled in an efficient and novel manner, and being very smooth in operation.

A still further object of the invention is to provide an improved disc brake assembly of the type operated by air pressure and employing pistons acting on brake shoes, the pistons being arranged to absorb a substantial portion of the torque applied to the brake shoes so that the brake shoes are not excessively abraded because of the necessity for absorbing the entire brake torque, the assembly being relatively easy to install, being easy to adjust, and requiring very little maintenance even over long periods of operation.

Further objects and advantages of the invention will become apparent from the following description and claims, and from the accompanying drawings, wherein:

FIGURE 1 is an elevational view of the wheel hub of a vehicle equipped with an improved disc brake assembly constructed in accordance with the present invention.

FIGURE 2 is an enlarged cross-sectional view taken substantially on the line 2—2 of FIGURE 1.

FIGURE 3 is an enlarged vertical cross-sectional view taken substantially on the line 3—3 of FIGURE 1.

Figure 5:
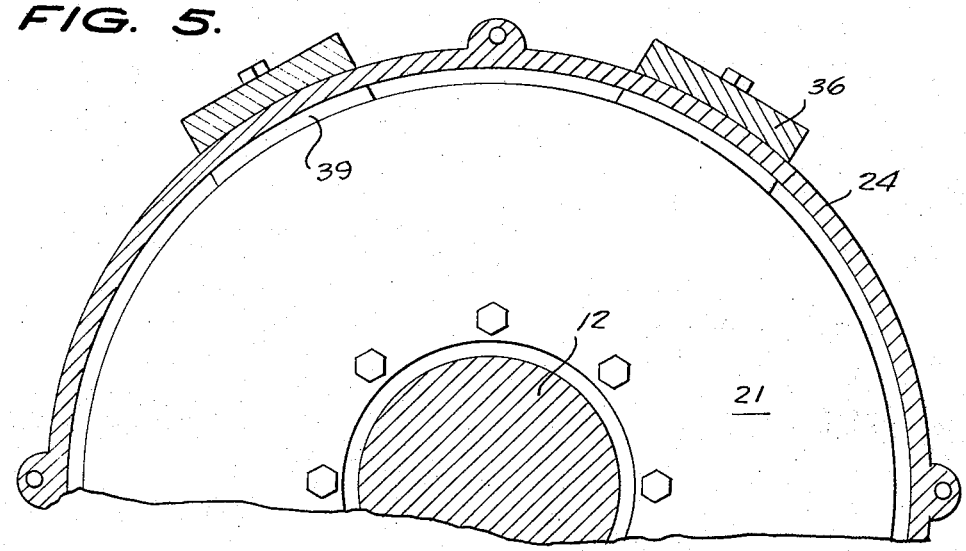
FIGURE 5 is a fragmentary vertical cross-sectional view taken substantially on the line 5—5 of FIGURE 2.
Figure 4:
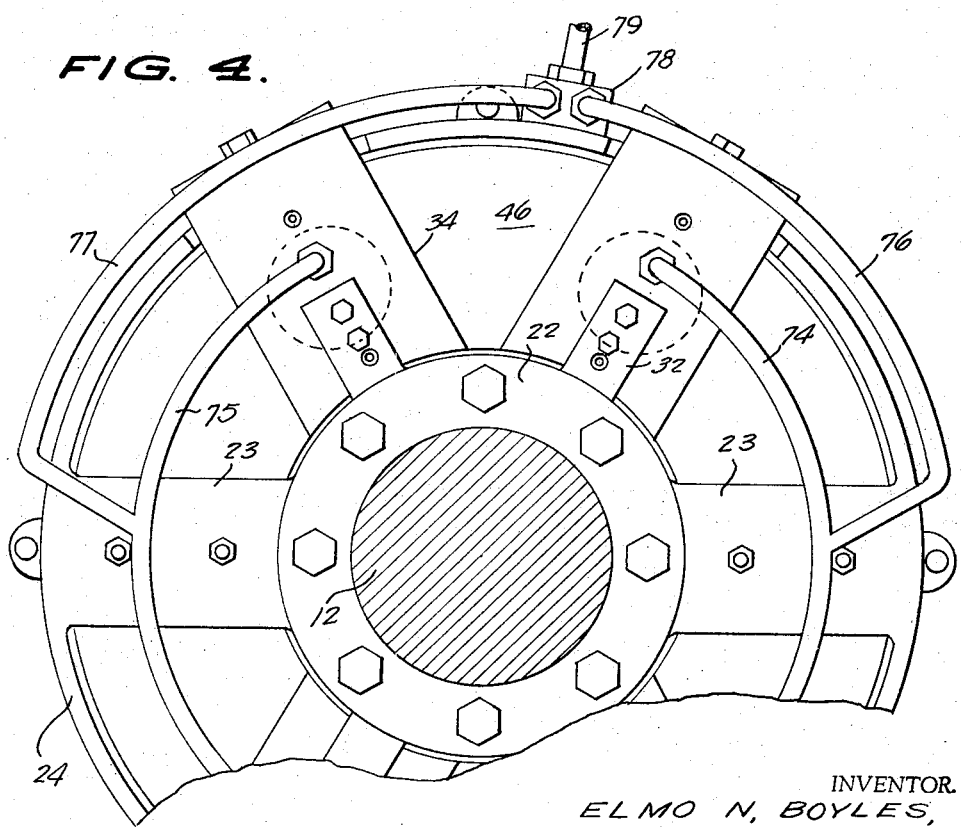
FIGURE 4 is a fragmentary vertical cross-sectional view taken substantially on the line 4—4 of FIGURE 2.

Referring to the drawings, 11 generally designates a typical vehicle wheel brake assembly constructed in accordance with the present invention. In the typical arrangement illustrated in the drawings, 12 designates a fixed vehicle axle member which terminates in reduced axle journal portion 13 on which is rotatably mounted a conventional wheel hub member 14, the wheel hub member being rotatably supported on respective spaced bearing assemblies 15 and 16 provided between the outer and inner annular sleeve-like portions 17 and 18 of the wheel hub member. Thus, the wheel hub member is also provided with a wheel attachment flange 19 which is apertured, as shown at 20, so that a conventional vehicle wheel may be secured thereto. The inner sleeve portion 18 is generally cylindrical in shape and extends inwardly over the enlarged intermediate portion of the axle 12. Secured to the rim of the sleeve portion 18 is the annular flat brake disc member 21 which therefore rotates with the the wheel hub 14.

The axle member 12 is secured in a conventional manner to the vehicle frame, so that the member 12 is non-rotatable relative to the frame. The axle member 12 is provided with the outwardly projecting annular flange 22, and rigidly secured to said flange is a ring member 32′ having diametrically opposite outwardly projecting radial arm portions 23, 23 integrally merging with a first annular housing ring segment 24 which concentrically surrounds shaft member 12. An opposing annular housing ring segment 25 is secured to the first-ring segment 24 and is interlocked therewith, by the provision of an annular locking lip 26 on the rim of segment 24 and an annular recess 27 on the rim of the segment 25 receiving the lip 26, as shown in FIGURE 3. The abutting portions of the segments 25 and 24 are provided with registering apertured lugs 28 and 29 which are fastened together by bolts 30. Housing segment 25 is provided at its outer side with inwardly projecting radial arms 31, 31 extending parallel to and opposite the radial arms 23, 23.

Formed integrally on ring member 32′ at spaced positions thereon are a plurality of outwardly projecting radial support bars 32. For example, two support bars are provided at each side of the diameter defined by the arms 23, 23, the support bars being symmetrically located and spaced evenly around the axis of shaft 12 from each other and from the arms 23, 23. The ring member 32′ is rigidly secured to the flange 22 in any suitable manner, for example by fastening bolts 33, as shown in FIGURE 2. Secured to each of the support bars 32 is a generally L-shaped brake cylinder block 34 having the radially extending relatively thick main body portion 35 and the plate-like outer flange portion 36 extending perpendicular to and outwardly from body portion 35, as shown in FIGURE 2. Flange 36 overlies the annular housing segment 24 and is rigidly secured thereto by fastening bolt 37. Similarly secured on the housing ring segment 25 opposing each L-shaped brake cylinder block 34 is a cooperating brake cylinder block member 38 having the radially extending main body portion 39 and the outer flange portion 40 which overlies the ring member 25 and is secured thereto by a bolt 41. The block portions 35 and 39 are thus supported parallel to each other on opposite sides of the rotating brake disc member 21 and in opposing relationship to each other.

The opposing thickened block portions 39 and 35 are formed with respective cylindrical bores 42 and 43 in which are sealingly and slidably disposed the respective brake pistons 44 and 45. The bores 42 and 43 are in axial alignment with each other on an axis extending perpendicular to the rotating brake disc element 21. Secured to the inside surfaces of the pairs of brake cylinders 45 at the respective opposite sides of the diameter defined by the radial arms 23, 23 are arcuate peripherally flanged, inwardly facing brake shoe plates 46, 46', so that each arcuate brake shoe plate 46 is secured to and actuated by two pistons 45. Secured to the inside surface of the rigid shoe plates 46 are respective arcuate blocks 47 of brake shoe friction material. Similar brake shoe plates 46' and arcuate blocks of friction material 47' are connected to the pairs of pistons 44, 44 on the opposite sides of the diameter defined by the arms 23, 23, being arranged in opposing relationship to the brake shoe plates 46 and arcuate friction blocks 47, with the rotating brake disc member 21 located therebetween.

The flanges 36 and 40 are rigidly interlocked with each other as well as with respect to the housing ring segments 24, 25 received thereunder, the respective cylinder block members 34 and 38 having right angled inside corner portions 50 and 51 snugly receiving the peripheral edges of the elements 24 and 25, as is clearly shown in FIGURE 2. The inner edges of the flange portions 36 are formed with flanges or projections 52 which are snugly received in similarly shaped recesses 53 formed at the inside edges of the flange elements 40.

Brake shoe adjustment screws 54 are threadedly engaged through the block portions 35 and 39 at opposite sides of the brake pistons 44 and 45, being accessible from the outside for adjustment, the inner ends of the screws being engageable with the rigid brake shoe plates 46 and 46' to limit their movement away from the rotating brake disc element 21.

The peripheral ring segments 24 and 25 are integrally formed with inwardly projecting lugs 55 and 56 spaced symmetrically on opposite sides of the rotating brake disc element 21, the lugs 55 and 56 being located adjacent the arms 23 and 31. Secured to the lugs and extending inwardly parallel to the arms 23 and 31 are respective plate members 57 and 58. The inner ends of the plate members 57 and 58 are rigidly secured respectively to the arms 23 and 31 by additional plate members 59 and 60 extending substantially parallel to the axis of the axle member 12, thus defining respective pairs of box-like enclosures at diametrically opposite sides of the axle 12 receiving the adjacent ends of the pairs of movable brake shoe assemblies 46, 47 and 46', 47'.

Figure 6:
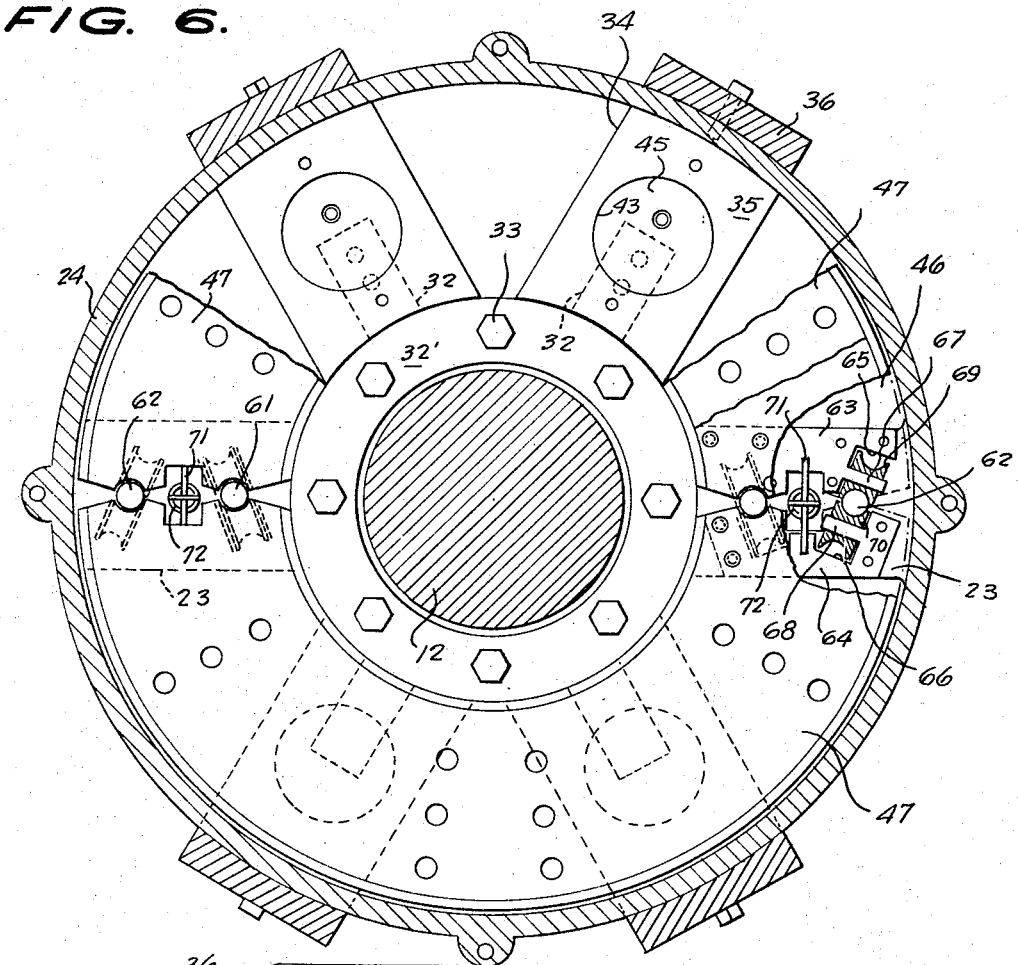
FIGURE 6 is a vertical cross-sectional view taken substantially on the line 6—6 of FIGURE 2.
Figure 7:
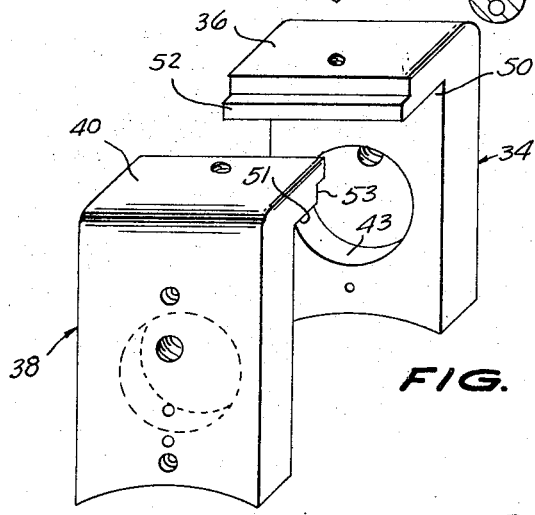
FIGURE 7 is a perspective view showing an opposing pair of brake cylinder block members, as employed in the assembly of FIGURES 1 to 6.

Secured to the arms 23 parallel to the axle member 12 but spaced outwardly in radial alignment are the pairs of guide rods 61, 62 whose inner ends are supportingly received in the plate members 57. Similar radially aligned spaced parallel pairs of guide rods 61', 62' are secured to the arms 31 with their inner ends supportingly received in the plate member 58. Secured to and extending transversely across the adjacent ends of the brake shoe supporting plates 46, 46 are supporting blocks 63 and 64 formed with pairs of recesses 65 and 66 located on opposite sides of the rods 62. Respective stub shafts 67 and 68 are secured to the blocks 63 and 64 in the recesses 65 and 66, as shown in FIGURE 6, the stub shafts 67 and 68 extending parallel to each other and being spaced symmetrically on opposite sides of the rods 62. Peripherally grooved guide rollers 69 and 70 are journalled on the stub shafts 67 and 68 receiving and engaging opposite sides of the support rods 62. Similar pairs of support rollers are provided for engaging the support rods 61. Thus, each adjoining pair of ends of the shoe assemblies 46, 47 is provided with pairs of rollers 69 and 70 engaging opposite sides of the fixed guide rods 62, 61.

Extending transversely across and secured to each adjacent pair of blocks 63, 64 is an anchor pin 71. A shoe biasing spring 72 has one end thereof connected to the anchor pin 71 and the opposite end thereof connected to an anchor lug 72' projecting from the adjacent arm 23, biasing the block members 63, 64 and the brake shoe assemblies to which they are attached toward the arms 23, namely, away from the rotating brake disc element 21.

Similar guide rollers 69' and 70' are provided on the ends of the brake shoe assemblies 46', 47', engaging the guide rods 62', 61', and biasing springs 72' are provided and supported in the same manner as the biasing spring 72 to urge the brake shoe assembly 46', 47' toward the arms 31, namely, away from the rotating brake disc assembly 21. Thus, the coil springs 72, 72' act to bias the pisons 45, 44 inwardly in the bores 43, 42, namely, away from the rotating brake disc element 21.

The springs 72, 72' bias the plate elements 46, 46' toward engagement with the adjustable stop screws 54. The outer ends of the cyliners 43 and 42 of the opposite sides of the assembly are connected together by respective pairs of conduits 74, 75 and 74', 75', the conduits 74 and 75 traversing the arms 23, 23 and the conduits 74', 75' traversing the arms 31, 31. Intermediate portions of the conduits 74, 75 are connected by additional conduits 76, 77 to a head or block 78 mounted on one of the pair of abutting outer flange members 36, 40. The intermediate portions of the conduit members 74', 75' are likewise connected by conduits 76', 77' to the common head or block 78. A pressure fluid supply conduit 79 is connected to the head or block 78 for simultaneously furnishing working fluid under pressure to the respective brake cylinders through the conduits 76', 77', 74', and 75', at one side of the assembly and through the conduits 76, 77, 74, 75 at the opposite side of the assembly.

When working fluid under pressure is introduced into the system through the conduit 79, as above described, such as compressed air, or any other suitable working fluid, the pistons 44, 45 are forced toward the rotating brake disc element 21, bringing the brake shoe assemblies 46, 47 and 46', 47' into working position. The pistons move the plate elements 46, 46' inwardly against the biasing force of the springs 72, 72' and thus move the friction members 47, 47' into braking engagement with the opposite surfaces of the rotating brake disc element 21. The brake shoe assemblies are smoothly guided by the cooperation of the pairs of rollers 69, 70 and 69', 70' with the fixed pairs of guide rod elements 62, 61 and 62', 61', as above described. This provides smooth application of the brakes with minimum vibration or chattering, thus assuring even application of the friction pads 47, 47' to the surfaces of the rotating disc element 21. The frictional force developed is transmitted through the brake pads 47', 47 and plate elements 46', 46 to the pistons 44, 45, which in turn transmit the force to the blocks 38, 34 which are rigidly connected through the housing segments 25, 24 and the arms 23, 23 of segments 24 to flange 22 which is in turn non-rotatably connected to the vehicle frame through the axle member 12. The braking force is thus applied in a simple and very direct manner with the braking reaction being developed at the inside cylindrical wall surfaces of the cylinder bores 42 and 43.

Since the block members 34, 38 are almost completely exposed, they present maximum heat dissipation surface areas directly exposed to the surrounding atmosphere, ensuring cool operating conditions. The assembly is efficiently ventilated because of the open spaces provided between the adjacent brake cylinder block members and between the block members and the pairs of diametrically opposed supporting arms 23, 23 and 31, 31. Thus, the heat generated by the frictional contact between the pads 47, 47' and the opposite surfaces of the rotating brake disc member 21 can be quickly and efficiently dissipated because of the high degree of exposure of the parts closely adjacent to the heat generating surfaces, namely, the opposite surfaces of rotating disc member 21.

While a specific embodiment of an improved disc brake assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A brake assembly for a vehicle wheel comprising a rotatable disc element adapted to be fixed to said wheel for rotation about the axis of the wheel, support means adapted to be fixedly-secured to the vehicle body and including annular ring means surounding said disc element, spaced inwardly-extending exposed radial opposing cylinder block means secured on said annular ring means and extending adjacent opposite sides of said disc element, said cylinder block means being formed with opposing brake cylinder bores located on opposite sides of the disc element, brake pistons in said cylinder bores, means to admit fluid under pressure into the brake cylinder bores behind the pistons, brake shoes disposed between the pistons and the disc element and being engageable with the disc element responsive to extension of the pistons relative to the cylinder bores, guide rod members fixed to the support means and extending parallel to the axis of the disc element, and rollers journalled to the ends of the brake shoes and supportingly-engaged with said guide rod members.

2. The brake assembly of claim 1, and wherein there are a plurality of pairs of opposing brake shoes and the guide rod members are located between the ends of adjacent brake shoes.

3. The brake assembly of claim 2, and wherein there are a pair of spaced parallel guide rod members between each set of adjacent ends of the brake shoes and wherein a pair of peripherally grooved rollers are journalled to each end of the brake shoes and are engaged with and receive the guide rod members.

4. The brake assembly of claim 1, and wherein the support means is provided with pairs of spaced parallel radial arm members and the guide rod members are secured to said radial arm members.

5. The brake assembly of claim 4, and wherein the pairs of spaced guide rod members are substantially in radial alignment relative to the axis of the disc element.

6. The brake assembly of claim 5, and respective coiled springs located between and parallel to the pairs of rod members and connected between the ends of the brake shoes and the outer radial arm members, urging the brake shoes away from the rotatable disc element.

References Cited

UNITED STATES PATENTS

| | | | |
|---|---|---|---|
| 1,875,095 | 8/1932 | Milan | 188—73 X |
| 2,816,631 | 12/1957 | Butler | 188—73 X |
| 2,907,412 | 10/1959 | Butler | 188—73 |
| 3,261,430 | 7/1966 | Wilson et al. | 188—73 |

FOREIGN PATENTS

| | | |
|---|---|---|
| 984,436 | 2/1965 | Great Britain. |
| 994,827 | 6/1965 | Great Britain. |

MILTON BUCHLER, *Primary Examiner.*

G. E. A. HALVOSA, *Assistant Examiner.*